United States Patent [19]
Brooke

[11] Patent Number: 5,264,881
[45] Date of Patent: Nov. 23, 1993

[54] SPLIT STATIC SURROUND DISPLAY SYSTEM

[75] Inventor: Kenneth R. Brooke, Arlington, Tex.

[73] Assignee: Hughes Training, Inc., Arlington, Tex.

[21] Appl. No.: 894,047

[22] Filed: Jun. 3, 1992

[51] Int. Cl.$^5$ ............................................. G03B 21/28
[52] U.S. Cl. ...................................... 353/94; 353/30; 352/69
[58] Field of Search .................... 353/94, 98, 99, 34, 353/37, 30; 352/69, 70, 71; 359/449, 451

[56] References Cited

U.S. PATENT DOCUMENTS

| | | | |
|---|---|---|---|
| 2,942,516 | 6/1960 | Disney et al. | 352/70 |
| 3,055,265 | 9/1962 | Smith | 352/70 |
| 3,144,806 | 8/1964 | Smith | 352/70 |
| 3,313,068 | 4/1967 | Pinto | 352/69 |
| 4,129,365 | 12/1978 | Aversano et al. | 353/94 |
| 4,641,918 | 2/1987 | Moffatt et al. | 352/69 |
| 4,991,955 | 2/1991 | Vetter | 352/69 |
| 4,995,718 | 2/1991 | Jachimowicz et al. | 353/33 |

Primary Examiner—William A. Cuchlinski, Jr.
Assistant Examiner—William C. Dowling
Attorney, Agent, or Firm—Wanda K. Denson-Low

[57] ABSTRACT

An inexpensive surround display system. In most general terms, the invention (10) includes a projector arrangement (12, 14, 16) for providing at least one beam of energy representative of an image. A beamsplitter arrangement (18, 20, 22) splits the beam into a first beam and a second beam. A screen (24) is provided for displaying a first image in response to the first beam and for displaying a second image in response to the second beam. More particularly, the method of the invention may be described as: a) determining a viewing angle of a viewer; b) determining whether an image or the mirror image thereof should be projected within the field-of-view of the viewer based on the viewing angle of the viewer; c) providing first, second and third beams of energy representative of a first, second and third images or the mirror images thereof based on step b); d) splitting the first beam to provide a first image and a diametrically opposed second image; e) splitting the second beam to provide a third image and a diametrically opposed fourth image; f) splitting the third beam to provide a fifth image and a diametrically opposed sixth image; and g) simultaneously displaying the first, second, third, fourth, fifth and sixth images.

11 Claims, 6 Drawing Sheets

FIG. 7
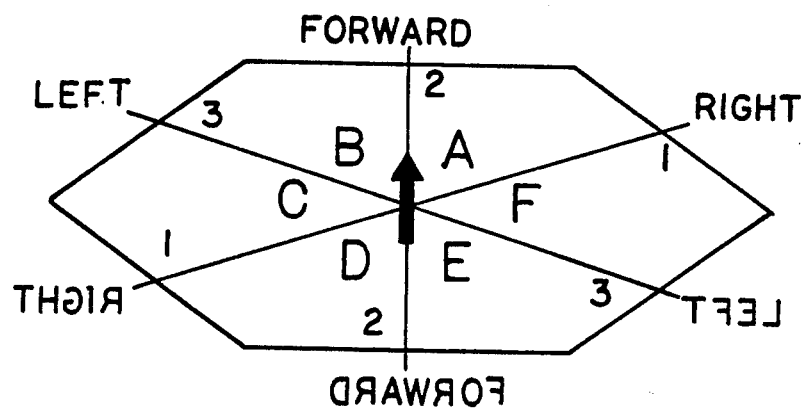
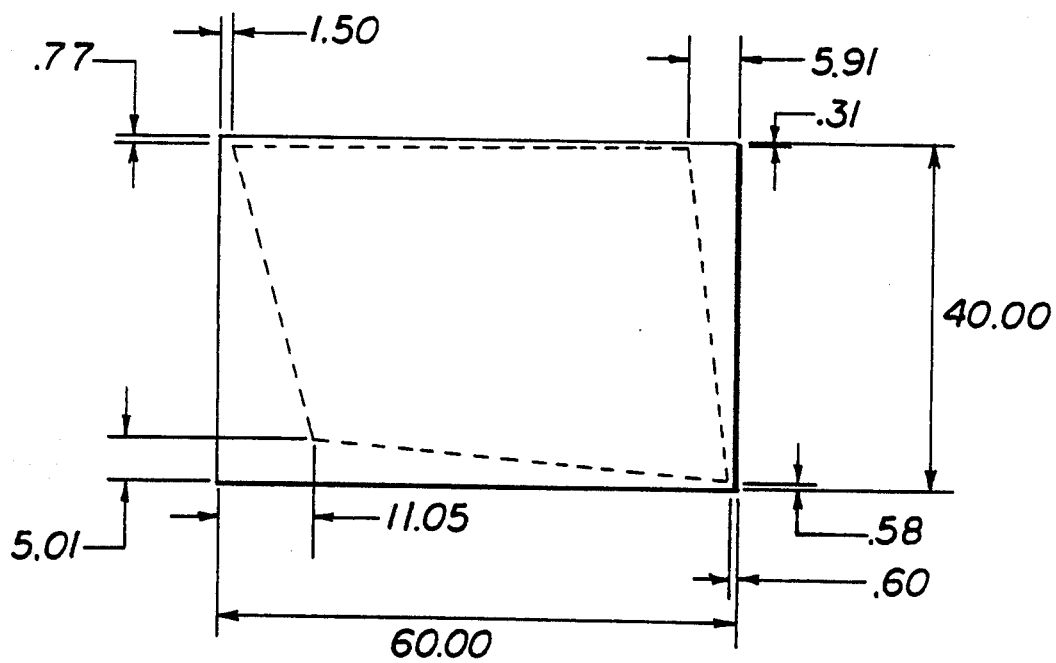
- - - - - PREDISTORTED IMAGE RASTER
(TO FIT ON TO FACET)
———— TOTAL AVAILABLE
IMAGE SURFACE
FIG. 8

SPLIT STATIC SURROUND DISPLAY SYSTEM

BACKGROUND OF THE INVENTION

1. Field of the Invention

The present invention relates to display systems. More specifically, the present invention relates to real time display systems utilized in simulators and the like.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Simulators are useful in providing realistic, artificial environments for military and commercial training applications. In many of these applications, it is desirable to provide a full 360 degree field-of-regard. This is generally referred to as a surround display system.

One current surround display system employs multiple, i.e. six, projectors. Each projector is mounted to provide imagery to one of several screens located around a viewpoint.

Each projector requires a separate image generator channel. Thus, while this system is adequate for many applications, the cost associated with the large number of projectors and an associated image generator channel for each, is considerable.

An alternative system employs fewer projectors, each projector being movable to provide imagery to more than one screen or more than one area of a circular screen in response to movement of the head of the viewer. Although, the cost of multiple projectors and image generator channels may be lessened to some degree by this approach, the cost of the mechanisms for slewing the projectors is still substantial. In addition, the multiplicity of moving parts creates a susceptibility for wear and associated maintenance problems thereby substantially increasing the cost of ownership.

Another alternative is provided by "head tracked" systems. These systems use a few fixed projectors and a movable optical arrangement. The movable optical arrangement serves to direct a small area of imagery within the viewer's field-of-regard from screen to screen in response to movement of the head of the viewer.

Once again, however, the advantages of this system are limited due to the inherent complexity of the system and the cost of the synchronized torque motors, complicated image de-rotation mechanism, optical joints, mirrors and other devices required to move the image. In addition, the moving components are subject to wear and the multiple optical elements may also adversely impact the performance of the system.

Thus, there is an ongoing need in the art for an inexpensive surround display system with low associated maintenance costs.

SUMMARY OF THE INVENTION

The need in the art is addressed by the present invention which provides an inexpensive surround display system. In most general terms, the invention includes a projector arrangement for providing at least one beam of energy representative of an image. A beamsplitter arrangement splits the beam into a first beam and a second beam. A screen is provided for displaying a first image in response to the first beam and for displaying a second image in response to the second beam.

The method of the invention may be described more particularly as:

a) determining a viewing angle of a viewer;

b) determining whether an image or the mirror image thereof should be projected within the field-of-view of the viewer based on the viewing angle of the viewer;

c) providing first, second and third beams of energy representative of a first, second and third images or the mirror images thereof based on step b);

d) splitting the first beam to provide a first image and a diametrically opposed second image;

e) splitting the second beam to provide a third image and a diametrically opposed fourth image;

f) splitting the third beam to provide a fifth image and a diametrically opposed sixth image; and g) simultaneously displaying the first, second, third, fourth, fifth and sixth images.

The invention provides an inexpensive display system with a 360° horizontal field of view of projected video images giving the illusion of an unencumbered view into a world created with computer-generated imagery. By tracking the viewer's direction of regard, the correct perspective is maintained within the field of view.

BRIEF DESCRIPTION OF THE DRAWINGS

FIG. 7 is a diagram illustrating the operation of the surround display system of the present invention.

FIG. 8 is a diagram illustrating a technique of image predistortion useful in the best mode of practicing the present invention.

DESCRIPTION OF THE INVENTION

Illustrative embodiments and exemplary applications will now be described with reference to the accompanying drawings to disclose the advantageous teachings of the present invention.

Figure 1:
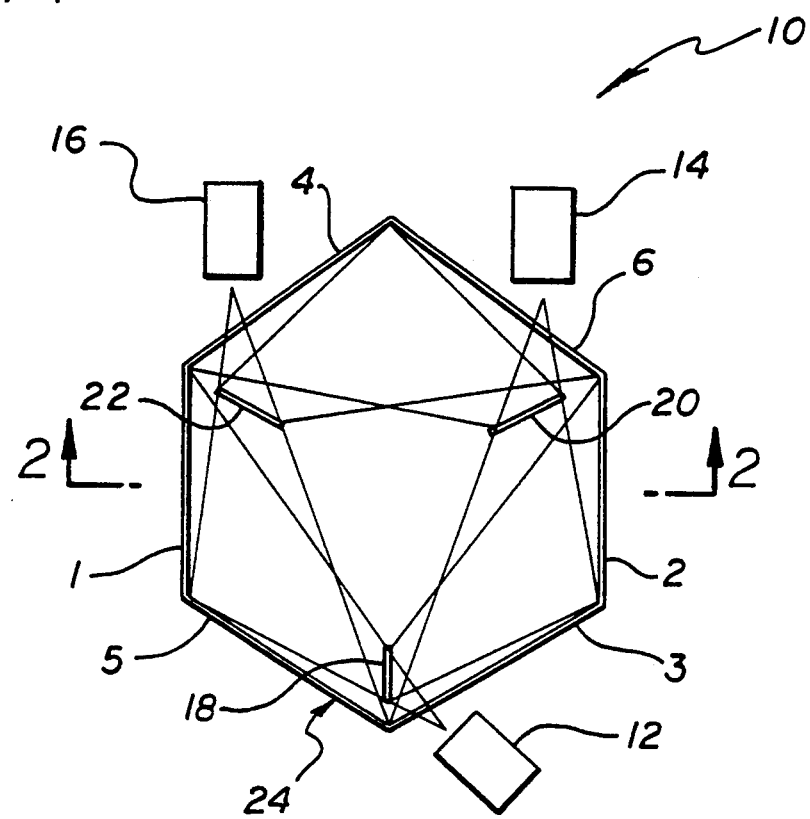
FIG. 1 is a simplified top view of the surround display system of the present invention.

FIG. 1 is a simplified top view of the surround display system 10 of the present invention. The system 10 includes first, second and third image projectors 12, 14 and 16, respectively. Many off-the-shelf projectors may be used without modification. Single exit pupil projectors are preferred due to the simplicity of dealing with a single cone of projected light. If the projectors are triple exit pupil RGB (red, green, blue) projectors, the projectors can be accommodated with larger beamsplitters when mounted in a vertical array. The projector must be capable of electronically mirror imaging the raster as with reflected projection or rear screen projection systems. This capability must be remote-controllable, and rapidly switchable, ideally within one video frame. Schiemflug adjustment is also desired as the projectors will be projecting from a fairly severe angle from the screen normal.

The first projector 12 is substantially diametrically opposed to the third projector 16. The second projector 14 is mounted as a mirror image to the third projector on the other side of a line equidistant from each projector and extending through the center of the screen 24.

The system 10 includes first, second and third beamsplitters 18, 20 and 22, respectively. In the preferred embodiment, the beamsplitters are implemented with half silvered mirrors. The beamsplitters should be neutral density and equally proportion the transmitted and reflected light. Any of the many off-the-shelf designs that meet these requirements may be used. The beamsplitters may be mounted directly to the projection lens. Single elongated beamsplitters are preferred to individual beamsplitters to ease alignment.

The first, second and third beamsplitters 18, 20 and 22, are mounted relative to the first, second and third projectors 12, 14 and 16, respectively to transmit a portion of the beam from an associated projector to a first surface of a screen 24 and to reflect a portion of the beam to a second surface of the screen 24. For example, the first beamsplitter 18 transmits a portion of the beam from the first projector 12 to a first surface 1 of the screen 24. Simultaneously, the first beamsplitter 18 reflects a portion of the beam from the first projector 12 to a second surface 2 of the screen 24. Likewise, the second beamsplitter 20 transmits a portion of the beam from the second projector 14 to a third surface 3 of the screen 24. Simultaneously, the second beamsplitter 20 reflects a portion of the beam from the second projector 14 to a fourth surface 4 of the screen 24. Finally, the third beamsplitter 22 transmits a portion of the beam from the third projector 16 to a fifth surface 5 of the screen 24. Simultaneously, the third beamsplitter 22 reflects a portion of the beam from the third projector 16 to a sixth surface 6 of the screen 24. Those skilled in the art will appreciate that the reflected images are mirror images of the transmitted images.

The screen 24 may be of conventional design and construction and of any shape that an even number of channels may cover, i.e., spherical, quadrilateral (4), hexagonal (6), octagonal (8), octagonal (10), octagonal (12), conical. The screen may be circular or hexagonal or any shape in between these extremes. In the illustrative embodiment, the screen 24 is hexagonal in shape. Hence, the first and second surfaces 1 and 2 are disposed in face-to-face relation in diametric opposition. Similarly, the third and fourth surfaces 3 and 4 are disposed in face-to-face relation in diametric opposition. Finally, the fifth and sixth surfaces 5 and 6 are disposed in face-to-face relation in diametric opposition.

The individual surfaces sized and position so that, when fully filled with imagery, each surface occupies a 60° horizontal by 45° vertical portion of the total field of view. This is to take advantage of the normal 3:4 aspect ratio of video image formats capable of being processed by off-the-shelf video projectors. Each projection screen should be coated with a low gain diffusion projection screen coating to enable the projected image to retain enough luminance to be visible from the side.

Figure 2:
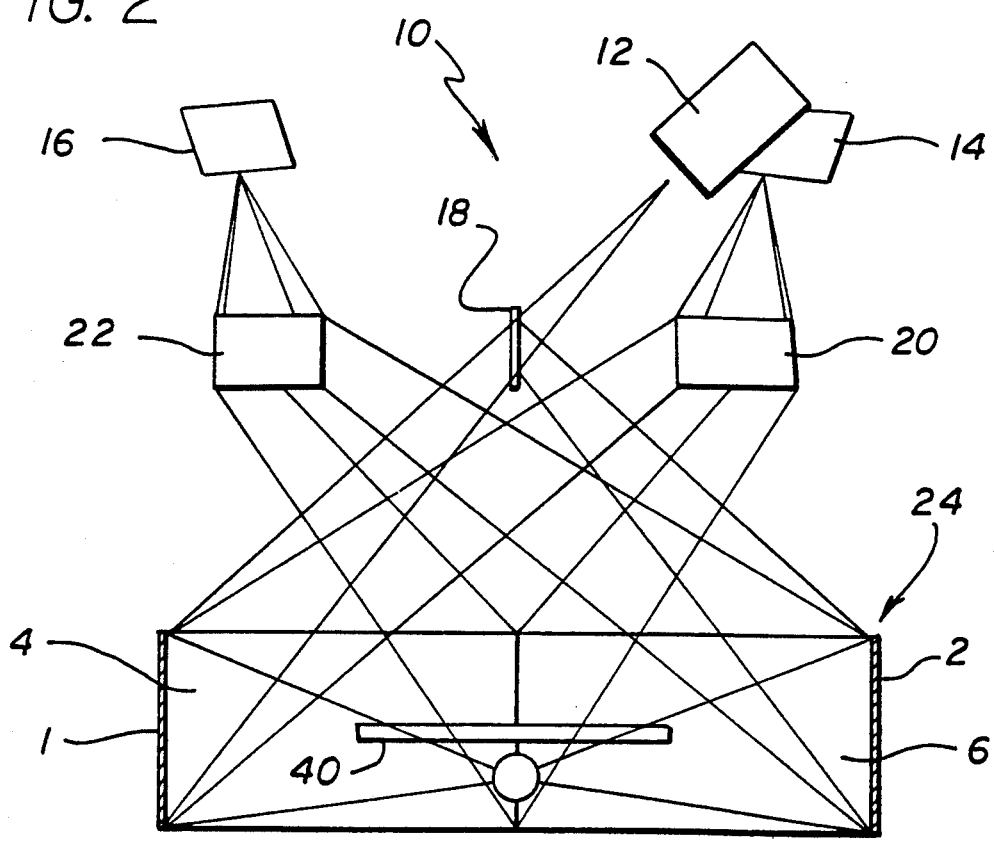
FIG. 2 is a simplified side view of the surround display system of the present invention taken along the line A—A of FIG. 1.

FIG. 2 is a simplified side view of the surround display system 10 of the present invention taken along the line A—A of FIG. 1. FIG. 2 shows a baffle 28 along with a dot 30 which represents a viewer. The baffle is positioned directly above the viewer's eyepoint to shield the projection equipment from direct view. The baffle 28 should be removable to allow access to the projection system for alignment and maintenance.

The positioning of the projectors and beamsplitters should meet the following criteria:

1) The light rays from the bottom of the projection screen to the beamsplitter plates should clear the baffle 28 above the observer's eyepoint.

2) The light ray path from any point on a projection screen to the beamsplitter should equal the light ray path from the corresponding opposite projection screen to the same point on the beamsplitter. That is, the beamsplitters should split the total display field in equal proportions and the beamsplitters and the screen should be perpendicular to the projected cone of light.

3) The beamsplitter and projector should not interfere with light from the other projectors and beamsplitters.

Figure 3:
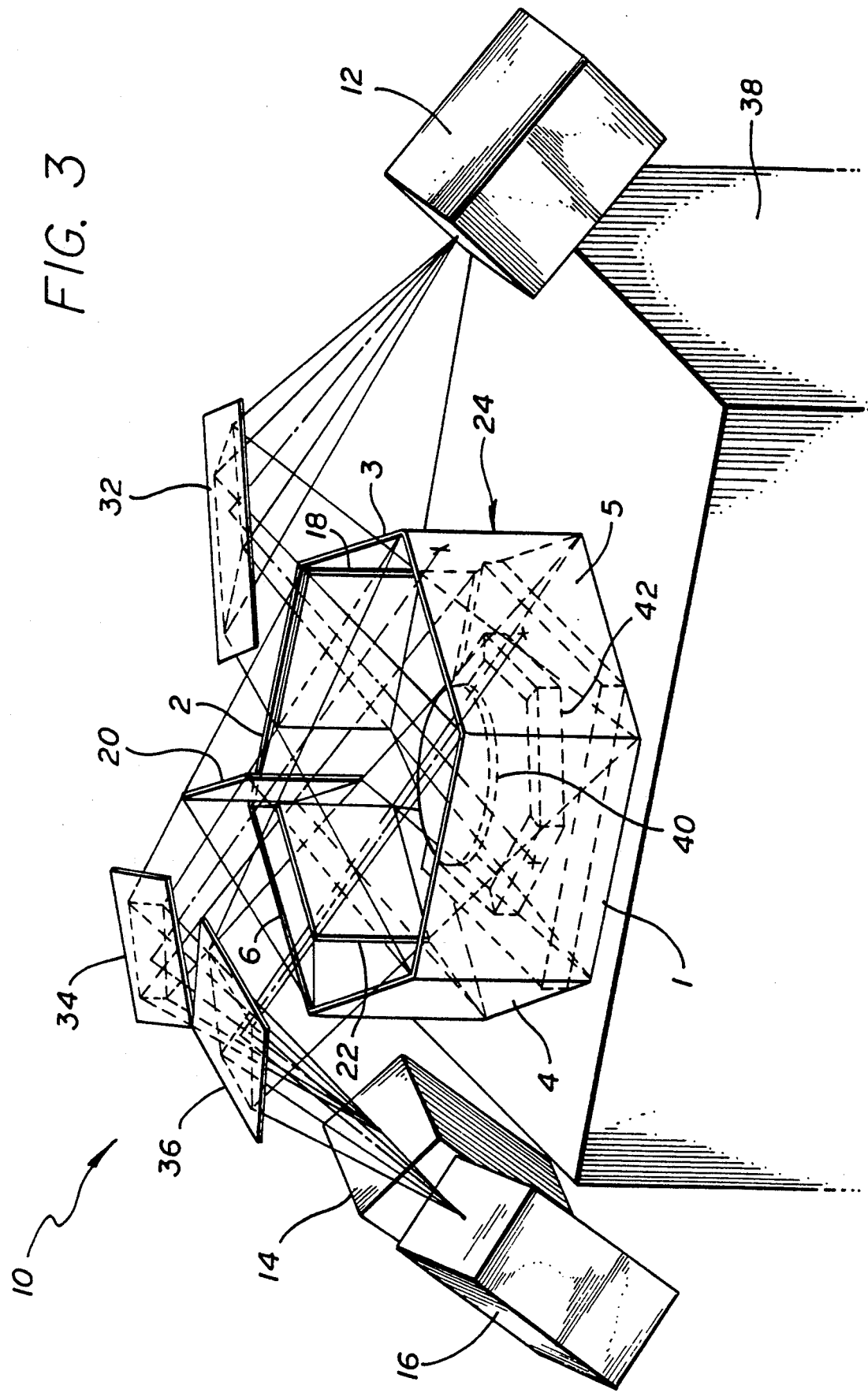
FIG. 3 is a detailed oblique view of the surround display system of the present invention.

FIG. 3 is a detailed oblique view of an illustrative implementation of the surround display system 10 of the present invention. FIG. 3 shows first, second and third optional fold mirrors 32, 34 and 36. The fold mirrors are mounted to reflect light from an associated projector to an associated beamsplitter. The fold mirrors allow the projectors to be positioned for compact packaging as will be appreciated by those skilled in the art.

The system 10 is mounted atop a module 38 in which a viewer may experience an artificial environment consistent with the design and function of the simulator. For example, the module may be a tank module, as shown, with a hatch cover 40 surrounded by several sight glasses (vision blocks).

Figure 4:
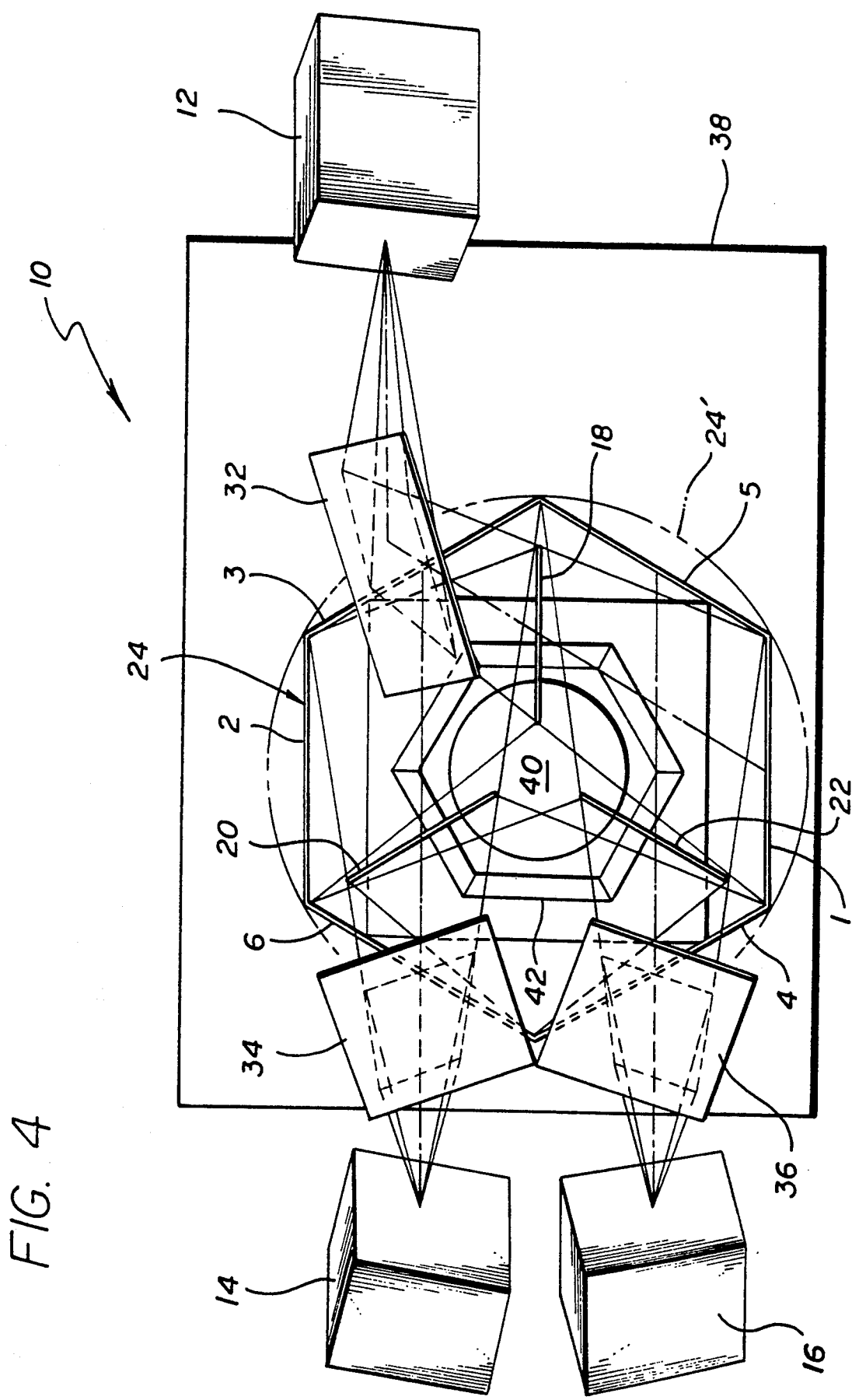
FIG. 4 is a detailed top view of the surround display system of the present invention.
Figure 5:
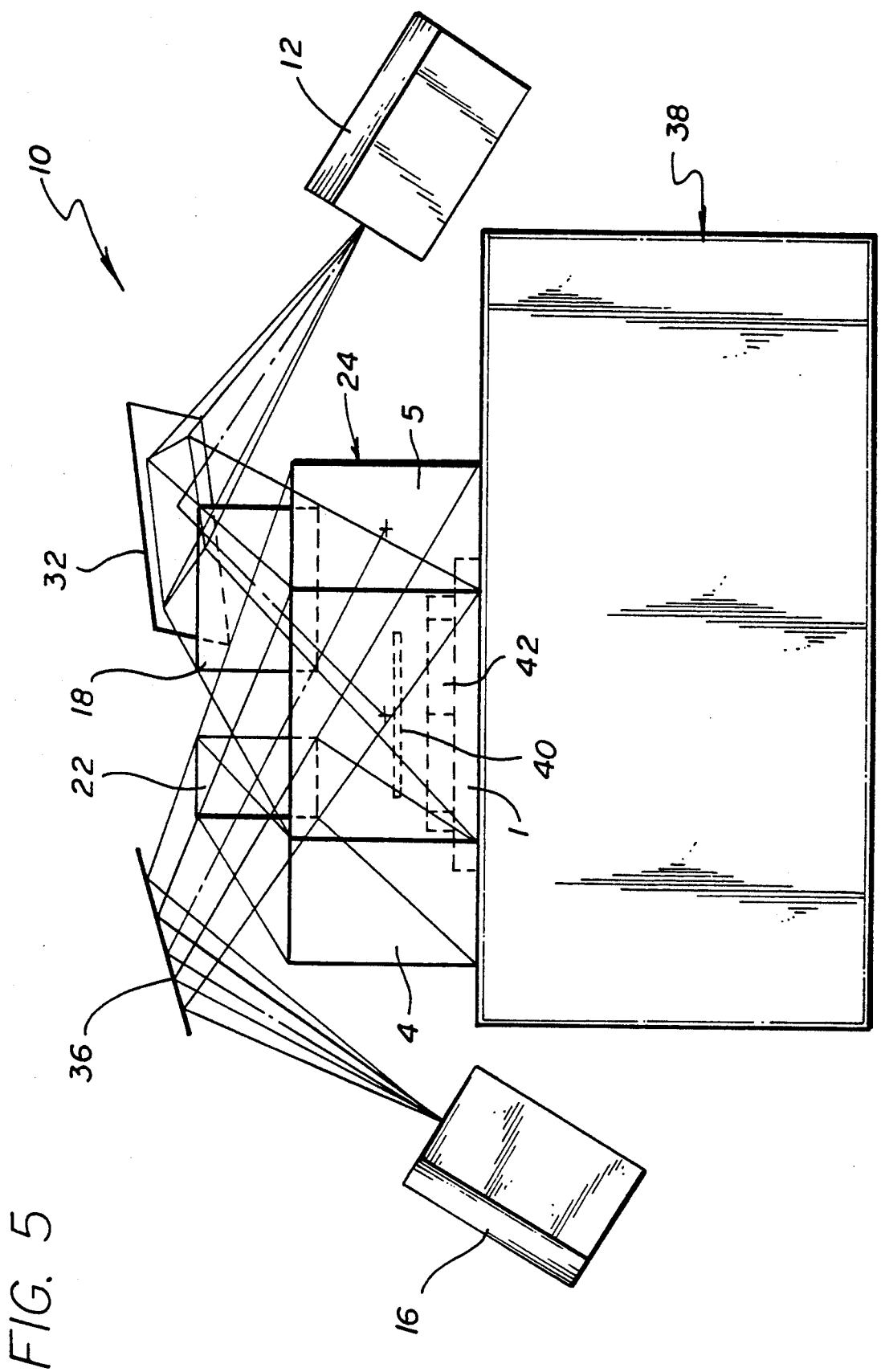
FIG. 5 is a detailed side view of the surround display system of the present invention.

FIG. 4 is a detailed top view and FIG. 5 is a detailed side view of the surround display system of FIG. 3. In FIG. 4, an alternative circular screen 24' is shown in phantom.

A conventional head tracking mechanism (not shown) is employed to monitor the viewer's head orientation (yaw only). A suitable head tracking mechanism may be purchased from Polhemus, the ISOTRACK model. The head tracking mechanism is utilized by the system 10 to select the proper field of view parameters for each video channel as discussed more fully below.

Figure 6:
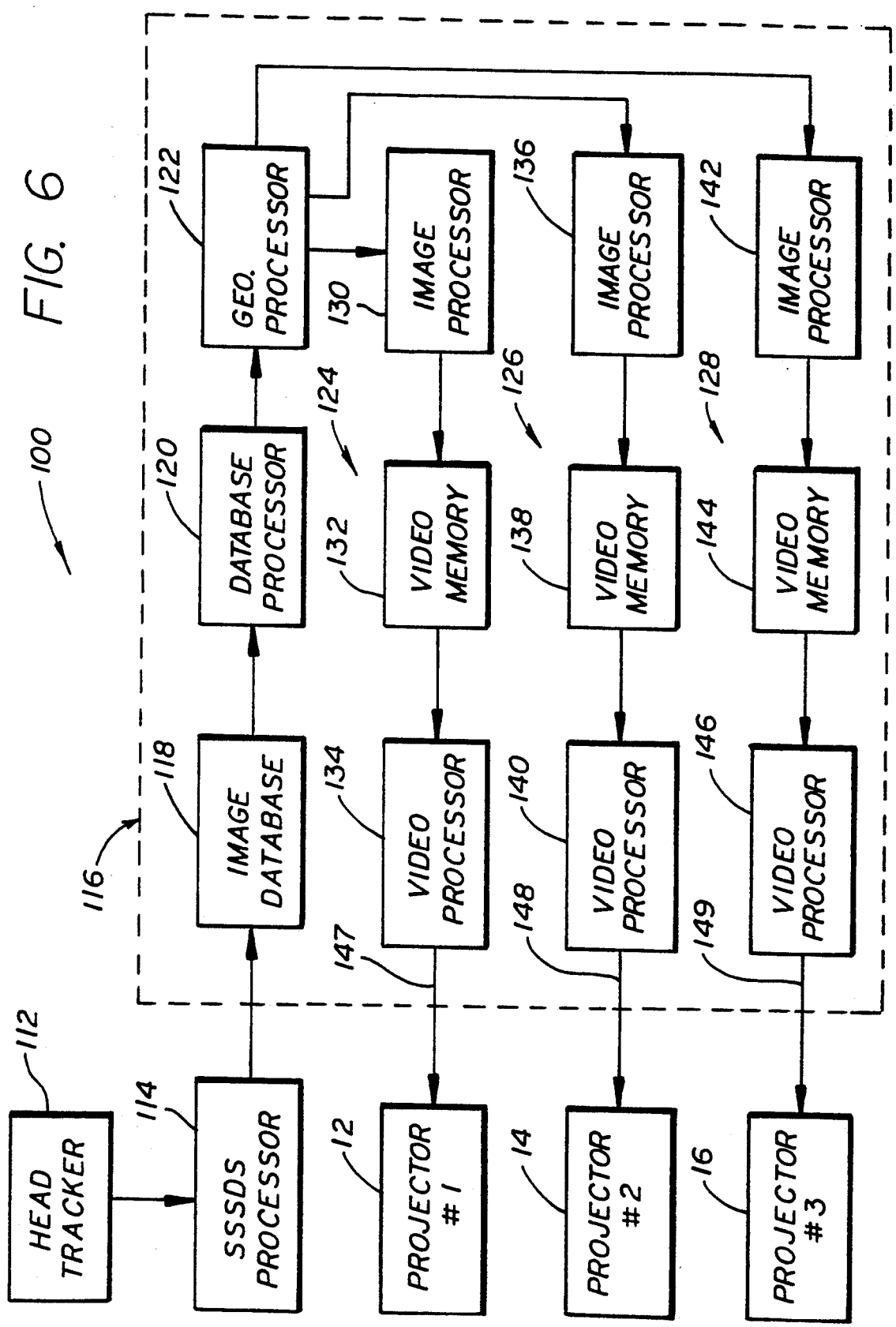
FIG. 6 is a block diagram of the electronic subsystem of the surround display system of the present invention.

FIG. 6 is a block diagram of the electronic subsystem 100 of the surround display system of the present invention. Inputs from the head tracker 112 are received by a split static surround display system (SSSDS) processor 114. The SSSDS processor 114 may be implemented with a microprocessor, application specific integrated circuit or combinational logic circuitry as is known in the art. The SSSDS processor 114 determines the direction of head motion and when the head of the viewer has moved from one zone to another. The SSSDS processor then signals the image generator to generate mirror images where the correct image is to be reflected so that the displayed image appears correct on a screen or area of a screen within the field of view of the viewer.

The output of the SSSDS processor 114 is input to a conventional image generator 116. The image generator typically includes an image generator 118, a database processor 120, a geometric processor 122, and an output channel for each channel. Each output channel typically includes an image processor, video memory and a video processor.

The database processor 120 determines which part of the database of image data to be displayed. The database processor performs a function with graphical data similar to that performed by a spreadsheet program on alphanumeric data such as LOTUS$_{tm}$ or DBASE IV$_{tm}$ and reorganizes the data based on external rules.

The output of the database processor is input to a geometric processor which performs a matrix translations, rotations and transformations to put the image data in an appropriate perspective for display on an object by object or polygon by polygon basis.

The output of the geometric processor is input to the image processor 130, 136 and 142 of each output channel 124, 126 and 128 respectively. The image processors 130, 136 and 142 map the three dimensional geometric information into a two dimensional representation based on input with respect to the location of the eyepoint of the viewer (e.g., size of screen, distance from screen and field of view). The planar representation of the image is stored in a video memory 132, 138 or 144.

First, second and third video processors 134, 140 and 146 convert the digital planar image data in the associated video memory into RGB (red, green, blue) sync video signals. These analog signals are then transmitted over coaxial cables 147, 148, and 149, respectively to the associated projectors 12, 14 and 16 respectively.

The video processors include random access memory digital to analog converters (RAMDACs), clock circuits, sync circuits, and etc. Those skilled in the art will appreciate that other image generators may be employed depending on the requirements of a given application.

FIG. 7 is a diagram illustrating the operation of the surround display system of the present invention. Because each image is transmitted and reflected, each projected image is actually simultaneously present on two screens. However, only one of the pair is perspectively correct at any given instant. The other image is a mirror image (left/right reversal) and is 180° out of phase in azimuth. The present invention ensures that the panel directly ahead of the viewer's direction of regard is correct, as well as the two panels on either side. As the viewer turn his head, the channel passing out of view is electronically reversed in the projector and its viewpoint is yawed 180° in the image generator. This corrects the perspective of the channel coming into view. The decision point is defined as when the direction of regard equals the midpoint of the forward channel. The switching parameters are chosen by the SSSDS processor 114 based upon the direction of rotation of the direction of regard. This ensures that the channel coming into view from the right is correct when the head is turned to the right, for example.

In sum, the operation of the invention is as follows. First, the viewing angle of the viewer is determined. This information is used to determine whether an image or the mirror image thereof should be projected within the field-of-view of the viewer. Next, first, second and third beams of energy representative of a first, second and third images or the mirror images thereof are provided. The first beam is then split to provide a first image and a diametrically opposed second image. Likewise, the second beam is split to provide a third image and a diametrically opposed fourth image. And the third beam is split to provide a fifth image and a diametrically opposed sixth image. Finally, the first, second, third, fourth, fifth and sixth images are displayed simultaneously to provide a 360° surround display.

FIG. 8 is a diagram illustrating a technique of image predistortion useful in the best mode of practicing the present invention. Such distortions may be necessary to correctly and completely fill the field-of-view of each channel.

Thus, the present invention has been described herein with reference to a particular embodiment for a particular application. Those having ordinary skill in the art and access to the present teachings will recognize additional modifications applications and embodiments within the scope thereof. For example, the invention is not limited to the technique shown for splitting the beams to provide the correct perspective on the displayed image. In addition, the invention is not limited to the number of projections shown, the shape of the screen or the application addressed by the illustrative embodiment.

It is therefore intended by the appended claims to cover any and all such applications, modifications and embodiments within the scope of the present invention.

Accordingly,

What is claimed is:

1. A surround display system comprising:
   projector means for providing a beam of energy representative of an image;
   beamsplitter means for splitting said beam of energy into a first beam and a second beam; and
   screen means for displaying a first image in response to said first beam and for displaying a second image in response to said second beam;
   wherein said projector means includes means for providing a beam representative of a mirror image of said image;
   wherein said projector means includes first, second and third image projectors, wherein said first and third projectors are mounted in diametric opposition;
   wherein said second and third projectors are mounted in face-to-face relation on either side of a line equidistant from said second and said third projectors and extending through a center of said projection system;
   wherein said beamsplitter means include a first beamsplitter for splitting the beam from the first projector to provide a first image on said screen means and a diametrically opposed second image on said screen means;
   wherein said beamsplitter means includes a second beamsplitter for splitting the beam from the second projector to provide a third image on said screen means and a diametrically opposed fourth image on said screen means.

2. The invention of claim 1 wherein said fourth image is the mirror image of said third image.

3. The invention of claim 1 wherein said beamsplitter means includes third a beamsplitter for splitting the beam from the third projector to provide a fifth image on said screen means and a diametrically opposed sixth image on said screen means.

4. The invention of claim 3 wherein said sixth image is the mirror image of said fifth image.

5. A surround display system comprising:
   projector means for providing a beam of energy representative of an image;
   beamsplitter means for splitting said beam of energy into a first beam and a second beam;
   screen means for displaying a first image in response to said first beam and for displaying a second image in response to said second beam;
   wherein said projector means includes means for determining a viewing angle of a viewer; and first processor means responsive to said means for determining a viewing angle of a viewer for determining whether an image or the mirror image thereof should be displayed within the field-of-view of the viewer.

6. The invention of claim 5 wherein said projector means includes an image generator.

7. The invention of claim 13 wherein said screen means includes a hexagonal screen.

8. The invention of claim 13 wherein said screen means includes a circular screen.

9. A surround display system comprising:

projector means for providing first, second and third beams of energy representative of an image, said projector means including:

first, second and third image projectors for providing said first, second and third beams of energy, said first and said third projectors being mounted in diametric opposition and said second and third projectors being mounted in face-to-face relation on either side of a line equidistant from said second and said third projector and extending through a center of said projection system, means for determining a viewing angle of a viewer, and first processor means responsive to said means for determining a viewing angle of a viewer for determining whether an image or the mirror image thereof should be projected by one or more of said projectors;

beamsplitter means for splitting said first, second and third beams of energy, said beamsplitter means including:

a first beamsplitter for splitting the beam from the first projector to provide a first image and a diametrically opposed second image, said second image being the mirror image of said first image, a second beamsplitter for splitting the beam from the second projector to provide a third image and a diametrically opposed fourth image, said fourth image being the mirror image of said third image, and a third beamsplitter for splitting the beam from the third projector to provide a fifth image and a diametrically opposed sixth image, said sixth image being the mirror image of said fifth image; and screen means including at least one screen for simultaneously displaying said first, second, third, fourth, fifth and sixth images.

10. The invention of claim 9 wherein said screen is a hexagonal screen.

11. A method for providing a surround display including the steps of:

a) determining a viewing angle of a viewer;

b) determining whether an image or the mirror image thereof should be projected within the field-of-view of the viewer based on the viewing angle of said viewer;

c) providing first, second and third beams of energy representative of a first, second and third images or the mirror images thereof based on step b);

d) splitting the first beam to provide a first image and a diametrically opposed second image;

e) splitting the second beam to provide a third image and a diametrically opposed fourth image;

f) splitting the third beam to provide a fifth image and a diametrically opposed sixth image; and g) simultaneously displaying said first, second, third, fourth, fifth and sixth images.

* * * * *